United States Patent [19]
Kriegesmann et al.

[11] Patent Number: 4,467,043
[45] Date of Patent: Aug. 21, 1984

[54] DENSE SHAPED ARTICLES OF POLYCRYSTALLINE α-SILICON CARBIDE AND PROCESS FOR THE MANUFACTURE THEREOF BY HOT-PRESSING

[75] Inventors: Jochen Kriegesmann, Durach-Bechen; Alfred Lipp, Bad Worishofen; Klaus Reinmuth, Durach, all of Fed. Rep. of Germany

[73] Assignee: Elektroschmelzwerk Kempten GmbH, Munich, Fed. Rep. of Germany

[21] Appl. No.: 507,932

[22] Filed: Jun. 23, 1983

Related U.S. Application Data

[63] Continuation of Ser. No. 158,730, Jun. 12, 1980, abandoned.

[30] Foreign Application Priority Data

Jun. 12, 1979 [DE] Fed. Rep. of Germany ....... 2923728

[51] Int. Cl.³ ............................................. C04B 35/36
[52] U.S. Cl. ........................................ 501/88; 264/65; 264/85; 501/89
[58] Field of Search ...................... 264/85, 65; 501/89, 501/88

[56] References Cited

U.S. PATENT DOCUMENTS

| | | | |
|---|---|---|---|
| 3,836,673 | 9/1974 | Weaver et al. | 501/89 |
| 4,135,937 | 1/1979 | Murata et al. | 501/89 |
| 4,230,497 | 10/1980 | Schwetz | 501/89 |

Primary Examiner—James H. Derrington
Attorney, Agent, or Firm—Burgess, Ryan & Wayne

[57] ABSTRACT

The invention relates to dense shaped articles of polycrystalline α-silicon carbide containing from 0.1 to 0.4%, by weight, of aluminum and optionally, a small amount of nitrogen and/or phosphorus, having a homogeneous virtually single-phase microstructure. The additional constituents are substantially in the form of a solid solution in the α-SiC lattice. The shaped articles are distinguished by flexural strength of at least 600 N/mm² up to 1450° C. and low subcritical crack propagation under mechanical stress. The fracture mechanism is trans granular up to at least 1450° C. The shaped articles are manufactured by simultaneously shaping and hot pressing pulverulent α-silicon carbide containing a small amount of an aluminum-containing additive, such as aluminum powder, aluminum nitride and/or aluminum phosphide, at temperatures between 1850° C. and 2300° C. under a pressure of at least 100 bar (10 MPa).

15 Claims, No Drawings

DENSE SHAPED ARTICLES OF POLYCRYSTALLINE α-SILICON CARBIDE AND PROCESS FOR THE MANUFACTURE THEREOF BY HOT-PRESSING

This application is a continuation of application Ser. No. 158,730, filed June 12, 1980, now abandoned.

BACKGROUND OF THE INVENTION

Shaped articles of polycrystalline silicon carbide are known. They are characterized by a combination of valuable properties such as resistance to oxidation and resistance to damage due to temperature changes, favorable creep behavior, relatively low density, low thermal expansion, high thermal conductivity and a high degree of hardness. On account of these properties, they are used as materials for combustion tubes, heat-exchange apparatus and rocket jets. Due to their good mechanical properties, they are also used in the field of abrasion technology and because of the electrical conductivity of silicon carbide, they are useful in electronics and electrical engineering.

It is known that pure silicon carbide cannot be densified to the theoretical density of 100% even with the application of pressure. For this reason, various additives are used as sintering aids which, depending on the particular process used, result in moderately dense to dense shaped articles. High density is not, however, alone the critical criterion which is responsible for good high temperature mechanical strength at temperature in the range of 1500° C. and higher. As used herein, mechanical strength means flexural strength. Good high-temperature strength is, however, of critical importance when the shaped articles are used as materials in high-temperature mechanical engineering applications as, for example, for hot gas turbines, which are subjected to working temperatures in this range.

The oldest known process for the manufacture of dense shaped articles of silicon carbide is based on reaction sintering, in which silicon carbide powder is processed with carbon and/or an organic resin binder to form preformed articles which are then heated in the presence of an atmosphere containing silicon. During the heating, the carbon reacts with the silicon to form additional SiC which joins the SiC grains already present together. At the same time, any cavities present are filled with excess silicon. Although the sintered articles obtained in this manner are virtually free of pores and have a high density, they contain free silicon. Their use as materials in high-temperature mechanical engineering applications is severely limited since, at temperatures above 1400° C., they tend to exude silicon (m.p. 1440° C.).

Dense shaped articles of silicon carbide can also be manufactured by the hot-pressing or a pressure sintering process with the use of additives containing aluminum or boron as sintering aids.

For example, in U.S. Pat. No. 3,836,673, dense hot-pressed shaped articles of fine-grained α-silicon carbide are described that contain from 0.5 to 5% by weight of aluminum which does not appear as a separate phase in X-ray diffraction analysis. To manufacture these articles, it is necessary to mill the pulverulent starting mixture for 15 to 60 hours prior to hot-pressing. The aforesaid patent teaches that the strength of the finished pressed article is directly proportional to the duration of milling. Although these shaped articles have a flexural strength of more than 7000 kgf/cm$^2$ (=687 N/mm$^2$) at room temperature, the flexural strength decreases sharply as the temperature rises and, at 1500° C., is only about 3140 kgf/cm$^2$ (=308 N/mm$^2$). These shaped articles do not have good high temperature properties which is confirmed by a substantially inter granular fracture mechanism.

Hot-pressed shaped articles consisting of fine-grained β-silicon carbide are known from U.S. Pat. No. 3,853,566 which are manufactured with the aid of a boron-containing additive or boron carbide. These shaped articles have a flexural strength of about 5600 kgf/cm$^2$ (=549 N/mm$^2$) at room temperature, but this flexural strength remains unchanged up to approximately 1400° C. and does not fall to values below 4000 kgf/cm$^2$ (=392 N/mm$^2$) below 1600° C. The fracture mechanism is trans granular both at room temperature and at higher temperatures. (A summary of the flexural strength and fracture modes of the above-mentioned sintered articles has been published by J. W. Edington et al in *Powder Metallurgy International* Vol. 7, No. 2, pages 82 ff. (1975).

In the hot-pressing of silicon carbide with a boron additive, exaggerated grain growth occurs, which accounts for the moderate mechanical strength properties. U.S. Pat. No. 4,108,929 describes a process for hotpressing silicon carbide with a boron additive and a carbon-containing additive. The articles which are interspersed with elemental carbon in the form of small particles have improved high-temperature properties. As can be seen from the examples in which β-SiC has been used as the starting material, the highest values for flexural strength (measured according to the three-point method) are 493.7 N/mm$^2$ (71,900 psi) at room temperature and 590.6 N/mm$^2$ (86,100 psi) at 1500° C. Despite the addition of carbon, the grain growth can be kept within limits only by observing critical conditions with regard to pressure (10,000 psi) and temperature (1950° C.). The narrow temperature range makes a high demand on precise temperature control which can be effected in this range only with difficulty. The application of such a process on an industrial scale involves unusually high costs.

Better control of the grain growth in the hot-pressing of SiC can be achieved, however, by using boron nitride as the sintering aid, in the process described in U.S. Pat. No. 3,954,483. The articles of β-SiC so produced, however, exhibit lowered mechanical strength properties, with the values for the flexural strength at room temperature of 476 N/mm$^2$ (69,000 psi) and at 1500° C. of 531 N/mm$^2$ (77,000 psi). Furthermore, the uniform microstructure is achieved at the expense of a lower density, which is in the region of 98% of the theoretical density of SiC (hereinafter abbreviated as % TD) and can be increased to a value approaching the theoretical density only by the additional concomitant use of boron in the form of elemental boron or boron carbide.

The use of silicon nitride instead of boron nitride as a sintering aid in the hot-pressing of SiC is described in U.S. Pat. Nos. 3,960,577 and 3,968,194. Silicon nitride is used in relatively large amounts (3.5% to 10%) and it is absolutely necessary to use boron in the form of elemental boron or boron carbide. As can be seen from the examples, when using β-SiC with the addition of 1% boron and 5% Si$_3$N$_4$, a shaped article is obtained which has a flexural strength of more than 600 N/mm$^2$ (1.03×10$^5$ psi) at room temperature. No information is given regarding the flexural strength at higher temperatures. It should not be possible to detect silicon nitride in amounts of about 5% as a separate phase by X-ray diffraction analysis. The manufacture of these articles requires critical conditions with regard to pressure (10,000 psi) and temperature (1950° C.) due to the tendency of silicon nitride to decompose at about 1800° C. and above. The possibility of the silicon nitride decomposing under the process conditions to form a metallic Si phase which impairs the strength of the sintered article at 1500° C. cannot be ruled out.

These disadvantages are confirmed by U.S. Pat. No. 4,023,975 which describes a process for the hot-pressing of SiC using beryllium carbide as the sintering aid. The advantages of the process are said to be that hot-pressing can be carried out within a wider temperature range and the sintered articles so obtained are free of vitreous and metallic Si phases which interfere with the mechanical strength at elevated temperature. The sintered articles manufactured according to this process, however, have structural grain sizes of up to 50 μm and, in addition, beryllium carbide is detectable as a separate phase. No numerical data are given regarding the mechanical strength of the articles. Given the two-phase character of the articles and the relatively coarse-grained microstructure, however, high values for mechanical strength are unlikely.

By means of the hot-pressing or pressure-sintering process, it is possible to manufacture shaped polycrystalline SiC articles having low porosity. The addition of aluminum as the sintering aid has hitherto proved best for obtaining a high density (at least 99% TD) and a fine-grained microstructure (average grain size in the region of approximately 5 μm) that is virtually single phase. The use of aluminum permits a wider temperature range in the hot-pressing process which is advantageous from the technical point of view.

Unfortunately, such aluminum-containing sintered SiC articles exhibit a sharp decrease in mechanical strength as the temperature is increased. The decrease in mechanical strength can be attributed to a vitreous aluminosilicate phase having been formed at the grain boundaries as a result of adding aluminum. Under stress at elevated temperature, the aluminosilicate phase gives rise to a sliding process at the grain boundaries resulting in subcritical crack propagation. This observation is confirmed by the fact that such SiC articles exhibit an inter granular fracture mechanism since subcritical crack propagation according to the grain boundary slide model is possible only in the case of inter granular fracture.

In the case of a trans granular fracture mechanism, on the other hand, the strength does not, as a rule, decrease when the temperature is increased. In this case, subcritical crack propagation has little effect even at high temperatures.

The n-exponent is used as a measure of the subcritical crack propagation. The n-exponent can be calculated from experimentally found data for the flexural strength at various stress rates according to the following equation $$\sigma_B = [c \cdot \sigma] \frac{1}{(m+1)}$$

wherein $\sigma_B$ denotes the flexural strength, $\sigma$ denotes the stress rate and c denotes a constant dependent on the material, as described by A. G. Evans—F. F. Lange in Journal of Materials Science, Vol. 10, (1975), pages 1659–1664. It follows that the higher the n-exponent, the lower the subcritical crack propagation. In the case of a commercially available shaped article of α-silicon carbide having an inter granular fracture mechanism which has been manufactured by hot-pressing using aluminum as the sintering aid, the authors have established an n-exponent of 21 at 1400° C.

SUMMARY OF THE INVENTION

The object of the invention, is to provide shaped articles of polycrystalline silicon carbide with improved properties, particularly improved resistance to oxidation, and mechanical properties which remain unchanged even at higher temperatures, and which can be manufactured in a simple manner by hot-pressing within a broad temperature range.

According to the present invention, shaped articles of polycrystalline silicon carbide are provided having a density of at least 99% of the theoretical density of SiC, consisting essentially of:

at least about 98.8% by weight of α-silicon carbide;
from 0.1 to 0.4% by weight of aluminum;
up to about 0.4% by weight of nitrogen and/or phosphorus;
up to about 0.2% by weight of oxygen; and
up to about 0.2% by weight of carbon, the α-silicon carbide being in the form of a homogeneous microstructure having grain sizes of not more than about 12 μm and the other constituents being substantially in the form of a solid solution in the α-SiC lattice. The articles have a flexural strength of at least 600 N/mm² up to at least 1450° C., measured according to the four-point method at a stress rate of at least 3 N.mm$^{-2}$.sec$^{-1}$, and a predominantly trans granular fracture mechanism.

DETAILED DESCRIPTION OF THE INVENTION

In the shaped articles of polycrystalline SiC according to the invention, aluminum and also the optionally present nitrogen and/or phosphorus, residual oxygen and residual carbon are substantially in the form of a solid solution in the α-SiC lattice which means that they are not detectable as a separate phase up to 2400-fold magnification.

Preferably, the shaped articles have a residual oxygen content and a residual carbon content of, in each case, less than 0.1% by weight, which originates in the α-SiC powder used for their manufacture. The concomitant use of additional carbon in the manufacture of the shaped articles according to the invention is not only unnecessary but also undesirable, since the resistance of the sintered articles to oxidation is adversely affected.

The fracture mechanism of the shaped articles up to temperatures of 1450° C. and above is trans granular. This ensures that the grain boundaries do not represent weak points for failure under stress. Under stress at an elevated temperature, the grain boundary sliding process (due to the presence of a viscous grain boundary phase) is suppressed and the subcritical crack propagation, which is promoted by these sliding processes is negligible. The numerical values for the n-exponent which has previously been discussed as a measure of the crack propagation, are correspondingly high at 1450° C., that is to say, in the range of at least 70 and, preferably, about 90.

The shaped articles of polycrystalline silicon carbide according to the invention therefore have high strength in the case of cyclic stress conditions and when loaded for long periods, they exhibit a high creep resistance.

The shaped articles of polycrystalline silicon carbide according to the invention are advantageously manufactured from pulverulent silicon carbide by hot-pressing. This process is characterized in that pulverulent SiC, substantially in the form of the α-modification and having a particle size distribution of 3 μm and finer, is homogeneously mixed with an aluminum-containing additive in an amount corresponding to from 0.1 to 0.4% by weight of free aluminum, based on the total weight of the solid constituents, and the mixture is then hot-pressed in the presence of an atmosphere that is inert to silicon carbide or in vacuo, with the application of a die pressure of at least 100 bar (10 MPa), at a temperature of from 1850° C. to 2300° C., until the shaped articles of polycrystalline silicon carbide have formed.

The starting material used for carrying out the process according to the invention is a silicon carbide micron powder having a particle size distribution finer than 2.0 μm, and preferably finer than 2 μm, which can be obtained with the necessary particle fineness by milling the compact bodies obtained from industrially produced SiC (Acheson process) and subsequent grading (air classification, elutriation). The specific surface area (measured according to the BET method) can be used as a measure of the particle fineness of the powder since, as experience has shown, the particle size itself cannot be determined with sufficient accuracy in the submicron range. The average particle size can be calculated by approximation from the specific surface area, according to the equation $$\overline{D} = \frac{6}{S \cdot \rho}$$

wherein $\overline{D}$ = average particle size in μm
$S$ = specific surface area in m$^2$/g
$\rho$ = powder density in g/cm$^3$ SiC powders having a specific surface area of from 4 to 20 m$^2$/g, and preferably within the range of from 4 to 14 m$^2$/g, have proved to be especially satisfactory in this case. On account of the high manufacturing temperature, the silicon carbide produced in the Acheson process generally has a predominant percentage of the thermodynamically more stable α-modification. Single-phase α-SiC can be obtained by sorting compact pieces from the inner zones of the silicon carbide roll formed in the Acheson resistance furnace. The best results are obtained starting from such single-phase α-SiC powders. Pretreatment with hydrofluoric acid and/or nitric acid is expedient in order to remove foreign substances, especially adherent silica and other oxygen-containing compounds which may result in an undesired increase in the residual oxygen content of the finished sintered article. The SiC powder should have a purity of at least 98%, preferably 99%.

The aluminum containing additive, in the specified amounts, is of critical importance for carrying out the process according to the invention, since our experiments have shown that the high-temperature strength decreases with higher contents of aluminum.

The aluminum-containing additive is advantageously used in the form of a powder having a particle size distribution of 10 μm and finer (micron powder), either as aluminum metal or as an aluminum compound. It is also possible, however, to use silicon carbide powder that has been doped with aluminum. Suitable aluminum compounds have proved to be aluminum carbide, aluminum nitride and, especially, aluminum phosphide. The use of oxygen containing aluminum compounds such as aluminum oxide, is not advantageous since their use may result in undesirably high residual oxygen contents in the finished sintered articles.

The aluminum-containing additive is used, according to the definition, in an amount from 0.1 to 0.4% weight calculated as free aluminum, based on the total weight of the solid constituents. Amounts smaller than 0.1% by weight of aluminum are virtually ineffective for the desired purpose that is, under the stated conditions, it was not possible to achieve sufficient densification of the silicon carbide with such amounts. Amounts larger than 0.4% by weight of aluminum are not suitable. Thus, it has been possible to establish that, with an aluminum content of 0.45% by weight, shaped articles are obtained which still exhibit a transgranular fracture mechanism at room temperature, but at temperatures above 1400° C., undergo intergranular fracture, which is associated with a detectable decrease in strength. With a further increase in the aluminum content to 1.5% by weight, the shaped articles exhibited intergranular fracture both at room temperature and at temperatures up to 1450° C. with marked decrease in strength at 1450° C. Under mechanical stress, high subcritical crack propagation occurred in this temperature range.

The use of nitrogen-free and phosphorus-free aluminum-containing additives results in sintered articles that have low electrical conductivity at room temperature and contain α-silicon carbide doped almost exclusively with aluminum. When using aluminum compounds containing nitrogen or phosphorus and/or silicon carbide powder doped with nitrogen or phosphorus, on the other hand, sintered articles having high electrical conductivity at room temperature can be obtained. The aluminum and nitrogen or aluminum and phosphorus are substantially in the form of a solid solution in the silicon carbide lattice, which is advantageous for subsequent electroerosion machining of the sintered articles.

The manner of carrying out the process according to the invention may be explained as follows:

A homogeneous mixture of the SiC powder with the aluminum containing additive is first prepared. The mixture can advantageously be prepared by dispersing the silicon carbide powder in an organic solvent together with the pulverulent aluminum-containing additive. Acetone and lower aliphatic alcohols containing from 1 to 6 carbon atoms may, for example, be used as the organic solvent. The dispersion may be carried out by mechanically agitating a thin liquid suspension or by kneading a thick liquid suspension in a kneading device, mill times of up to approximately 2 hours generally being sufficient. It was not possible to detect any further increase in the strength of the finished pressed sintered article as a result of extending the mill time for the starting powder mixture. After removing the solvent, which can be effected, for example, in the case of a thin liquid suspension, by spray-drying or freeze-drying or, in the case of a thick liquid suspension, by evaporation during the kneading process, the homogeneous powder obtained is hot-pressed and simultaneously shaped.

The pressure sintering in the broad temperature range is preferably carried out in a graphite pressing device heated by resistance or induction. The die pressure applied is within the range of from 100 bar (10 MPa) to approximately 800 bar (80 MPa). The temperature program (heating-dwelling-cooling) required for the pressure-sintering can be varied as a function of the die pressure and the temperature. Heating times of approximately 20 to 30 minutes and dwell times at the maximum temperature of about 10 to 60 minutes generally are sufficient.

The powder mixture to be densified can be surrounded in the hot-pressing device by an inert atmosphere or a vacuum. In the presence of an inert atmosphere, i.e., a protective gas atmosphere that is inert SiC, the surrounding gas pressure is usually normal pressure (1.01 bar=0.101 MPa). Noble gases such as argon or helium or preferably, a reducing atmosphere, such as CO or $H_2$, can be used as protective gas atmospheres. The pressure-sintering may be carried out in vacuo at a gas pressure of less than 50 mbar (less than 5000 Pa), a gas pressure of $\leq 30$ mbar ($\leq 3000$ Pa) having proved particularly favorable.

The process according to the invention is described in detail with reference to the following Examples.

EXAMPLE 1

The starting materials used were an $\alpha$-SiC powder having a specific surface area of 7.6 $m^2/g$ and a degree of purity of 99.1% by weight, and aluminum metal powder having a specific surface area of 4.8 $m^2/g$.

333 g of the $\alpha$-SiC powder were mixed with 1 g of the aluminum powder (corresponding to an aluminum addition of 0.3% by weight of free aluminum, based on the total weight of the solid constituents) and 220 g of acetone in a kneading device for 2 hours. The powder obtained after completion of kneading was then dried at 50° C. for 12 hours in a vacuum oven. The powder mixture was then hot-pressed in a graphite mold in vacuo at a gas pressure of 30 mbar (3000 Pa) using a die pressure of 400 bar (40 MPa) at 2150° C. The heating time was 25 minutes and the dwell time at the high temperature was 60 minutes. After switching off the oven, the sintered article was cooled to room temperature in the mold. After removal from the mold, a cylindrical article having a diameter of 72 mm, a depth of 25 mm and a density of 3.201 $g/cm^2$, corresponding to 99.7% TD was obtained.

Samples having final dimensions of 3.15×4.1×35 mm were cut with diamond tools from this article and the flexural strength was determined at a test temperature of 1450° C. The flexural strength was measured according to the four-point method at an outer span width of 30 mm and an inner span of 15 mm with 3 different stress rates. The results (mean values from 16 individual measurements in each case) are compiled in the following Table.

TABLE 1

| Stress Rate ($N/mm^2 \cdot sec$) | Flexural Strength ($N/mm^2$) |
|---|---|
| 0.3 | 646 |
| 3.0 | 662 |
| 30.0 | 679 |

An n-exponent of approximately 90 was determined from these data according to the formula given in the description.

The fracture surfaces of the samples were treated with dilute hydrofluoric acid and examined ceramographically in a scanning electron microscope. They all exhibited a predominantly transgranular fracture. The polished sections of the samples were etched with boiling alkaline solution of ferric cyanide to make the grain boundaries visible. They showed an average structural grain size of 3 $\mu m$ with a maximum of 7 $\mu m$.

EXAMPLE 2

A powder mixture was prepared and hot-pressed under the same conditions as described in Example 1, from 334 g of an $\alpha$-SiC powder having a specific surface area of 9.1 $m^2/g$ and a degree of purity of 98.8% by weight, and 0.67 g of the aluminum metal powder used in Example 1 (corresponding to an aluminum addition of 0.2% by weight of free aluminum, based on the total weight of the solid constituents). The sintered article had a density of 3.205 $g/cm^3$, corresponding to 99.8% TD.

The flexural strength (determined in the same manner as in Example 1) at a stress rate of 3 $N/mm^2$.sec are compiled, according to test temperature, in Table 2 (mean values from 8 individual measurements in each case).

TABLE 2

| Temperature (°C.) | Flexural strength ($N/mm^2$) |
|---|---|
| 20 | 638 |
| 700 | 636 |
| 1000 | 648 |
| 1200 | 654 |
| 1370 | 661 |
| 1450 | 663 |

Ceramographic examination of the samples revealed substantially the same structure as in Example 1.

EXAMPLE 3

A powder mixture was prepared and hot-pressed, under the same conditions as in Example 1, from 84.5 g of the $\alpha$-SiC powder from Example 1 and 0.73 g of aluminum phosphide (corresponding to an aluminum addition of 0.4% by weight of free aluminum, based on the total weight of the solid constituents).

The resulting sintered article had a density of 3.205 $g/cm^3$, corresponding to 99.8% TD. The flexural strengths (determined in the same manner as in Example 1) at a stress rate of 3 $N/mm^2$.sec are compiled, according to test temperature, in Table 4 (mean values from 6 individual measurements in each case).

TABLE 3

| Temperature (°C.) | Flexural strength ($N/mm^2$) |
|---|---|
| 20 | 671 |
| 1450 | 673 |

An average structural grain size of 2 $\mu m$ with a maximum of approximately 4 $\mu m$ was determined by ceramographic examination. The fracture behavior was transgranular both at 20° C. and at 1450° C.

The following Examples 4 and 5 are for the purpose of comparison. They show that addition of a larger amount of aluminum impairs the strength of the sintered articles at higher temperatures.

EXAMPLE 4 (comparison)

A powder mixture was prepared and hot-pressed, under the same conditions as in Example 1, from 85 g of the $\alpha$-SiC powder from Example 1 and 0.385 g of the aluminum powder from Example 1 (corresponding to an aluminum addition of 0.45% by weight of free aluminum, based on the total weight of the solid constituents).

The resulting sintered article had a density of 3.205 g/cm$^3$, corresponding to 99.8% TD.

The flexural strengths (determined in the same manner as in Example 1) at a stress rate of 3 N/mm$^2$.sec are compiled, according to test temperature, in Table 4 (mean values from 6 individual measurements in each case).

TABLE 4

| Temperature (°C.) | Flexural strength (N/mm$^2$) |
| --- | --- |
| 20 | 663 |
| 1450 | 593 |

As this Table shows, there is a clearly discernible decrease in flexural strength at 1450° C. The fracture surface of samples broken at room temperature exhibited an almost completely transgranular fracture, but at 1450° C. a substantially intergranular fracture occurred.

EXAMPLE 5 (comparison)

A powder mixture was prepared, under the same conditions as in Example 1, from 84 g of the α-SiC powder from Example 1 and 1.28 g of the aluminum powder from Example 1 (corresponding to an aluminum addition of 1.5% by weight of free aluminum, based on the total weight of the solid constituents). Hot-pressing was likewise effected under the same conditions, with the modification that the heating time was 20 minutes and the dwell time at the high temperature of 2020° C. was 20 minutes.

The resulting sintered article had a density of 3.208 g/cm$^3$, corresponding to 99.9% TD.

The flexural strengths (determined in the same manner as in Example 1) at a stress rate of 3 N/mm$^2$.sec are compiled, according to test temperature, in Table 5 (mean values from 6 individual measurements in each case).

TABLE 5

| Temperature (°C.) | Flexural strength (N/mm$^2$) |
| --- | --- |
| 20 | 732 |
| 1450 | 383 |

The data in the Table clearly shows that at 1450° C., an extraordinarily sharp decrease in the flexural strength has occurred. The fracture surface of the samples exhibit predominantly intergranular fracture both at room temperature and at 1450° C.

What is claimed is:

1. A process for the manufacture of shaped articles of polycrystalline silicon carbide having a density of at least 99% of the theoretical density of SiC, consisting essentially of:
   at least about 98.8% by weight of α-silicon carbide;
   from 0.1 to 0.4% by weight of aluminum;
   up to about 0.4% by weight of nitrogen and/or phosphorus;
   up to about 0.2% by weight of oxygen; and
   up to about 0.2% by weight of carbon, the α-silicon carbide being in the form of a homogeneous microstructure having grain sizes of not more than 12 μm and the other constituents being substantially in the form of a solid solution in the α-SiC lattice, and having a flexural strength of at least 600 N/mm$^2$, up to at least 1450° C., measured according to the four-point method at a stress rate of at least 3 N.mm$^{-2}$.sec$^{-1}$, and a predominately transgranular fracture mechanism, said process comprising:
   (a) forming a homogeneous mixture of pulverulent silicon carbide substantially in the form of the α-modification and having a particle size distribution of 3 μm and finer with from 0.1 to 0.4% by weight of the mixture calculated as free aluminum based on the total weight of solid constituents of an aluminum-containing additive as a sintering aid, and
   (b) hot-pressing the mixture in a die at a temperature of from 1850° C. to 2300° C. and a die pressure of at least 100 bar in an atmosphere inert to silicon carbide or in a vacuum for a sufficient length of time to form the desired product.

2. A process according to claim 1, wherein a silicon carbide powder that is exclusively in the form of the α-modification is used.

3. A process according to claim 2, wherein a silicon carbide powder having a specific surface area of from 4 to 14 m$^2$/g is used.

4. A process according to claim 1, wherein the aluminum-containing additive is used in the form of a powder having a particle size distribution of 10 μm and finer.

5. A process according to claim 4, wherein the aluminum-containing additive is selected from the group consisting of aluminum metal, an aluminum compound, and mixtures thereof.

6. A process according to claim 5, wherein the aluminum compound is selected from the group consisting of aluminum nitride, aluminum phosphide and mixtures thereof.

7. A process according to claim 1, wherein the pressure-sintering is carried out in vacuo at a gas pressure of less than 50 mbar (5000 Pa).

8. A process according to claim 1, wherein the pressure-sintering is carried out in a protective gas atmosphere.

9. The process of claim 8, wherein the gas atmosphere consists essentially of a gas selected from the group consisting of argon, helium, CO, H$_2$ and mixtures thereof.

10. Shaped articles made by the process of claim 1.

11. Shaped articles according to claim 10 having an n-exponent of the subcritical crack propagation of at least 70 at 1450° C.

12. Shaped articles of claim 11 wherein the subcritical crack propagation is at least 90.

13. The shaped articles of claim 11 or 10 wherein the residual oxygen content is less than about 0.1% by weight.

14. The shaped articles of claim 5 or 10 wherein the residual carbon content is less than about 0.1% by weight.

15. The shaped articles of claim 11 or 10 wherein the residual oxygen content and carbon content are each less than about 0.1% by weight.

* * * * *